United States Patent
Simmons et al.

(10) Patent No.: US 8,473,011 B2
(45) Date of Patent: Jun. 25, 2013

(54) METHOD AND APPARATUS ALLOWING FOR USER-SELECTABLE ACOUSTIC EQUALIZER SETTINGS FOR VOICE CALLS

(75) Inventors: Sean Bartholomew Simmons, Waterloo (CA); Chris Forrester, Kitchener (CA); Craig Eric Ranta, Kitchener (CA); Magnus Hansson, Waterloo (CA)

(73) Assignee: Research In Motion, Waterloo (CA)

( * ) Notice: Subject to any disclaimer, the term of this patent is extended or adjusted under 35 U.S.C. 154(b) by 82 days.

(21) Appl. No.: 12/969,946

(22) Filed: Dec. 16, 2010

(65) Prior Publication Data

US 2011/0086629 A1    Apr. 14, 2011

Related U.S. Application Data

(63) Continuation of application No. 11/848,876, filed on Aug. 31, 2007, now Pat. No. 7,877,116.

(51) Int. Cl.
*H04M 1/00* (2006.01)

(52) U.S. Cl.
USPC ......... 455/569.1; 455/563; 381/103; 715/716

(58) Field of Classification Search
USPC .................. 455/550.1, 566, 569.1, 575.2; 379/420.01–420.04, 428.03
See application file for complete search history.

(56) References Cited

U.S. PATENT DOCUMENTS

| | | | |
|---|---|---|---|
| 6,115,620 A * | 9/2000 | Colonna et al. | 455/569.1 |
| 6,381,469 B1 * | 4/2002 | Wojick | 455/550.1 |
| 7,016,503 B2 | 3/2006 | Willis | |
| 7,406,308 B2 | 7/2008 | Moon | |
| 7,877,116 B2 | 1/2011 | Simmons et al. | |
| 2008/0101589 A1 * | 5/2008 | Horowitz et al. | 379/388.03 |
| 2009/0323998 A1 | 12/2009 | Tarvonen et al. | |
| 2010/0029337 A1 | 2/2010 | Kuhl et al. | |

OTHER PUBLICATIONS

European Patent Office, Communication Pursuant to Article 94(3) EPC relating to application No. 07115490.0 dated Mar. 23, 2009, Munich Germany.
DNT, MP3 Q-Stick Bedienungsanleitung, Drahtlose Nachrichtentechnik Entwicklungs—und Vertriebs GmbH Voltastraße 4 D-63128 Dietzenbach, http://www.dnt.de, Dec. 6, 2006.
Operator Field Test Display's, Net Monitor pro telefony Nokia 6110/5110, 6130/5130, 6150, 8810 as found at URL http://gsm4u.cz/Nokia/Netmonitor/Net_Monitor_N51xx-61xx_a_.

* cited by examiner

*Primary Examiner* — Christian Hannon
(74) *Attorney, Agent, or Firm* — Ridout & Maybee LLP

(57) ABSTRACT

A user is allowed to select an acoustic equalizer setting from among a plurality of predetermined acoustic equalizer settings. Upon receiving an indication of a selection of a given acoustic equalizer setting, a handheld telephony device processes voice call downlink audio, based on the given acoustic equalizer setting and drives an audio output device with the processed audio signal.

20 Claims, 4 Drawing Sheets

METHOD AND APPARATUS ALLOWING FOR USER-SELECTABLE ACOUSTIC EQUALIZER SETTINGS FOR VOICE CALLS

CROSS-REFERENCE TO RELATED APPLICATIONS

The present application is a continuation of U.S. patent application Ser. No. 11/848,876, filed Aug. 31, 2007, the contents of which are hereby incorporated herein by reference. The present application is related to U.S. Provisional Patent Application Ser. No. 61/052,434, filed May 12, 2008, and U.S. patent application Ser. No. 12/363,800 the contents of each of which are hereby incorporated herein by reference.

FIELD OF THE INVENTION

The present application relates generally to wireless mobile telephony and, more specifically, to a method and apparatus allowing for user-selectable acoustic equalizer settings for voice calls.

BACKGROUND OF THE INVENTION

When designing a handset for use in mobile telephony, handset designers start with an ear model. Additionally, handset designers typically pay close attention to the requirements of the mobile telephone network operators (carriers) that will market and sell the handsets. Currently, carriers require that handsets be designed based on either a "high-leak" ear model or a "low-leak" ear model. In the high-leak ear model, an attempt at forming a seal between a mobile telephone handset and a user's ear is expected to form a consistent seal that has a significant acoustic leak. In the low-leak ear model, an attempt at forming a seal between a mobile telephone handset and a user's ear is expected to form a consistent seal that has insignificant acoustic leak. A user of that handset may change the position, and subsequently the acoustic leak, throughout a phone call or based on personal holding position. Also, every user has a different acoustic load due to variations in ear size and shape; accordingly, the user may prefer a lower leak design or a higher leak design.

Tuning a handset often involves creating an optimum acoustic equalizer (EQ) setting. An acoustic EQ setting determines which frequencies of received audio are amplified, and to what extent, before the received audio is sent to a handset speaker, and, potentially, which frequencies are suppressed, and to what extent. The goal is to meet a specific "frequency-versus-level mask". Such masks are determined by standards bodies, such as The 3rd Generation Partnership Project (3GPP, see www.3gpp.org).

Unfortunately, in use, users are often unable to form a consistent seal between the ear and the handset. The amount of acoustic leak from the seal is dependent on the manner in which the handset is held by the user and the size and shape of the user's ear. Under those circumstances wherein the user forms a low-leak seal and the handset has been designed with a single acoustic EQ setting that assumes a high-leak seal, the user may complain about poor audio quality. For example, the user may complain that received audio sounds "boomy" or "muddy". Given the variety of user ear shapes and sizes, along with the variety of manners in which users hold the handset, it may be considered to be impossible to establish a single acoustic EQ setting that will meet the requirements of all users and certification bodies.

BRIEF DESCRIPTION OF THE DRAWINGS

Reference will now be made to the drawings, which show by way of example, embodiments of the invention, and in which.

DETAILED DESCRIPTION OF THE EMBODIMENTS

A user is allowed to select an acoustic equalizer setting from among a plurality of predetermined acoustic equalizer settings. Upon receiving an indication of a selection of a given acoustic equalizer setting, a handheld telephony device processes voice call downlink audio based on the given acoustic equalizer setting and drives an audio output device with the processed audio signal.

In accordance with an aspect of the present application there is provided a method of allowing for user selection of acoustic equalizer settings, the method comprising receiving an indication of a selection of a given acoustic equalizer setting from among a plurality of predetermined acoustic equalizer settings, receiving, over a wireless telephony link, voice call downlink audio, processing the voice call downlink audio, based on the given acoustic equalizer setting, to generate a processed audio signal and driving an audio output device with the processed audio signal. In other aspects of the present application, a handheld mobile telephony apparatus is provided for carrying out this method and a computer readable medium is provided for adapting a processor to carry out this method.

Other aspects and features of the present invention will become apparent to those of ordinary skill in the art upon review of the following description of specific embodiments of the invention in conjunction with the accompanying figures.

Figure 1:
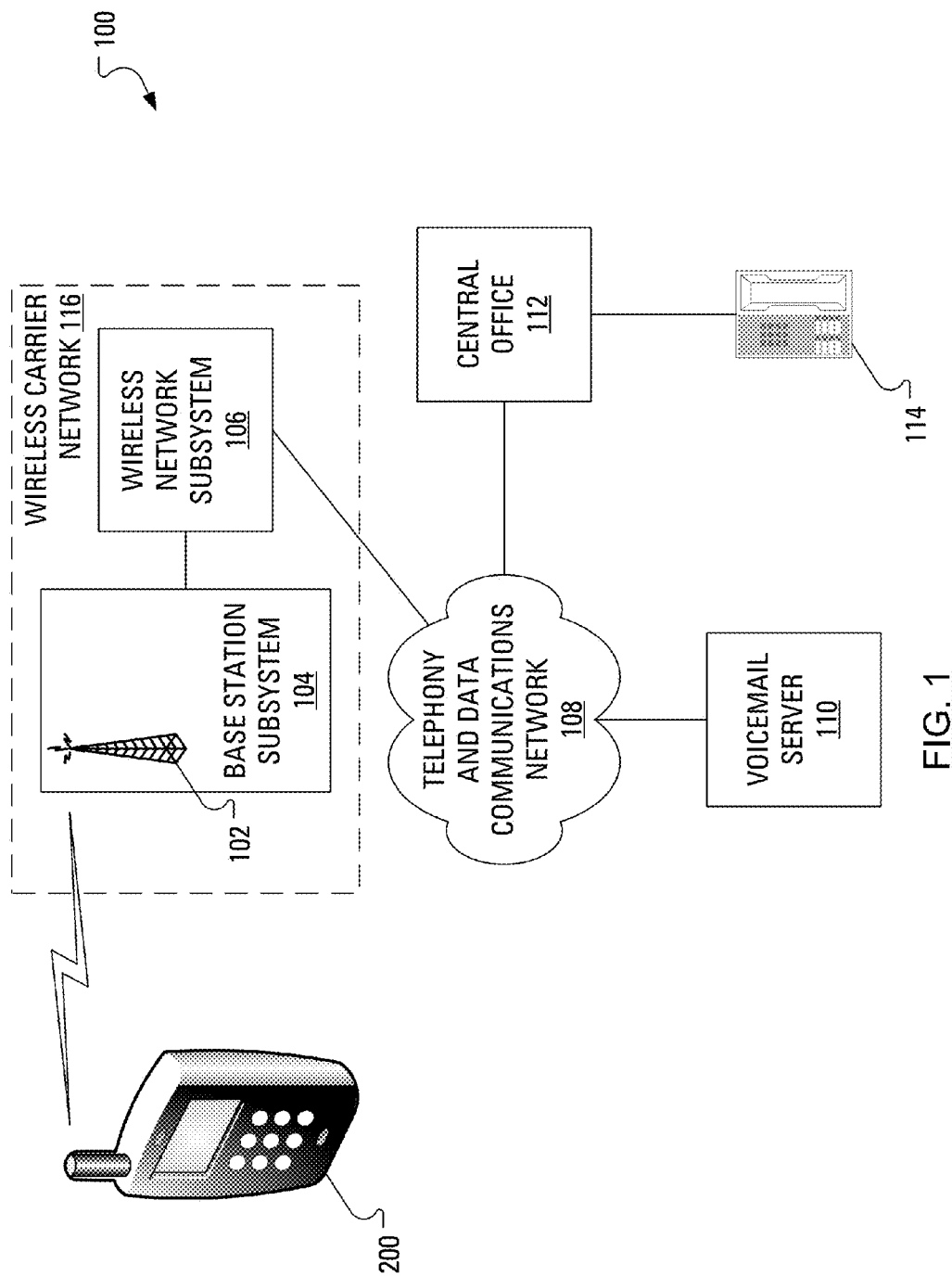
FIG. 1 illustrates elements of an example network environment for the operation of a mobile telephone station apparatus.

Reference is now made to FIG. 1, which illustrates elements of an examplary network environment 100 for the operation of a mobile telephone station apparatus 200. The elements of the examplary network environment 100 include a wireless carrier network 116 and a telephony and data communication network 108.

The telephony and data communication network 108 may be considered to represent at least one wide area network, such as the present day Internet and successor networks, as well as, potentially, multiple local area networks and a public switched telephone network (PSTN).

The wireless carrier network 116 includes a base station subsystem 104 and a wireless network subsystem 106. A base station radio tower 102, with which the mobile telephone station apparatus 200 may communicate wirelessly, is provided as part of the base station subsystem 104. The base station subsystem 104 connects to a wireless network subsystem 106. The wireless network subsystem 106, which may include, in part, a Mobile-services Switching Center (MSC), is connected to the telephony and data communication network 108.

Also connected to the telephony and data communication network 108 is a voicemail server 110 for performing voicemail services, such as receiving, storing, and providing voicemail messages.

A central office 112 allows a traditional land-line telephone station apparatus 114 to connect to and utilize the telephony and data communication network 108. Additionally, the land-line telephone station apparatus 114 can connect to the voicemail server 110. The land-line telephone station apparatus 114 can access the data communication network 108 or voicemail server 110 by an input device such as a keypad (not shown).

Figure 2:
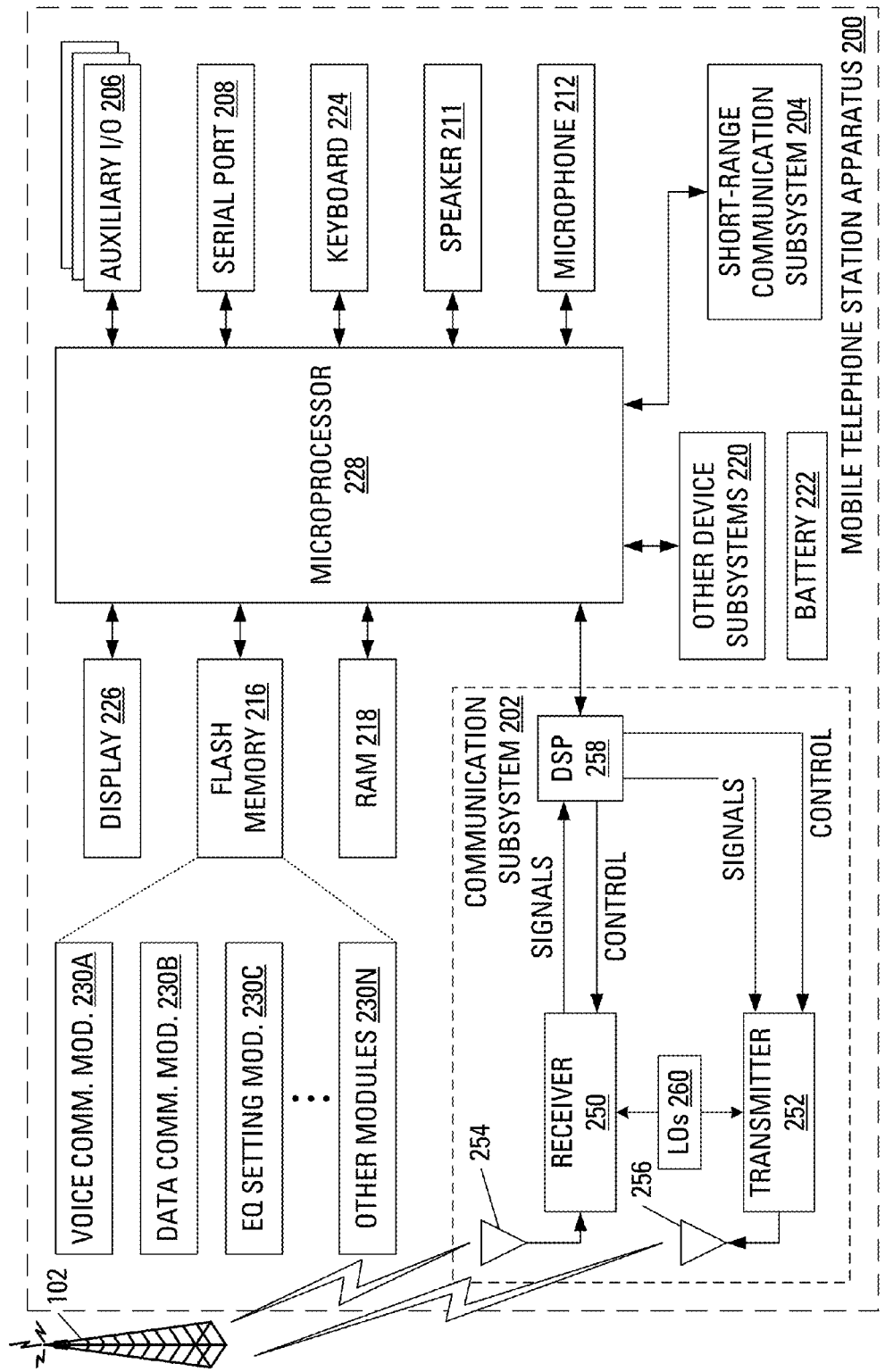
FIG. 2 illustrates an example structure for the mobile telephone station apparatus of FIG. 1.

FIG. 2 illustrates the mobile telephone station apparatus 200 including a housing, an input device (such as a keyboard 224 or a navigation tool (not shown)), and an output device (a display 226), which may be a full graphic or full color Liquid Crystal Display (LCD). Other types of output devices may alternatively be utilized. A processing device (a microprocessor 228) is shown schematically in FIG. 2 as coupled between the keyboard 224 and the display 226. The microprocessor 228 controls the operation of the display 226, as well as the overall operation of the mobile telephone station apparatus 200, in response to actuation of keys on the keyboard 224 by a user.

The housing may be elongated vertically, or may take on other sizes and shapes (including clamshell housing structures). The keyboard may include a mode selection key, or other hardware or software, for switching between text entry and telephony entry.

In addition to the microprocessor 228, other parts of the mobile telephone station apparatus 200 are shown schematically in FIG. 2. These include: a communication subsystem 202; a short-range communication subsystem 204; the keyboard 224 and the display 226, along with other input/output devices including a set of auxiliary input/output devices 206, a serial port 208, a speaker (an audio output device) 211 and a microphone 212; as well as memory devices including a flash memory 216 and a Random Access Memory (RAM) 218; and various other device subsystems 220. The mobile telephone station apparatus 200 may have a battery 222 to power the active elements of the mobile telephone station apparatus 200. The mobile telephone station apparatus 200 may be a two-way radio frequency (RF) communication device having voice and data communication capabilities. In addition, the mobile telephone station apparatus 200 may have the capability to communicate with other computer systems via the Internet.

Operating system software executed by the microprocessor 228 may be stored in a computer readable medium, such as the flash memory 216, but may be stored in other types of memory devices, such as a read only memory (ROM) or similar storage element. In addition, system software, specific device applications, or parts thereof, may be temporarily loaded into a volatile store, such as the RAM 218. Communication signals received by the mobile device may also be stored to the RAM 218.

The microprocessor 228, in addition to its operating system functions, enables execution of software applications on the mobile telephone station apparatus 200. A predetermined set of software applications that control basic device operations, such as a voice communications module 230A and a data communications module 230B, may be installed on the mobile telephone station apparatus 200 during manufacture. An equalizer setting module 230C may also be installed on the mobile telephone station apparatus 200 during manufacture, to implement aspects of the application. As well, additional software modules, illustrated in FIG. 2 as other software module 230N, which may be, for instance, a personal information manager (PIM) application, may be installed during manufacture. The PIM application may be capable of organizing and managing data items, such as e-mail messages, calendar events, voice mail messages, appointments, and task items. The PIM application may also be capable of sending and receiving data items via the wireless carrier network 116. The data items managed by the PIM application may be seamlessly integrated, synchronized and updated via the wireless carrier network 116 with the device user's corresponding data items stored or associated with a host computer system.

Communication functions, including data and voice communications, may be performed through the communication subsystem 202 and, possibly, through the short-range communication subsystem 204. The communication subsystem 202 includes a receiver 250, a transmitter 252 and one or more antennas, illustrated in FIG. 2 as a receive antenna 254 and a transmit antenna 256. In addition, the communication subsystem 202 also includes a processing module, such as a digital signal processor (DSP) 258, and local oscillators (LOs) 260. The specific design and implementation of the communication subsystem 202 is dependent upon the communication network in which the mobile telephone station apparatus 200 is intended to operate. For example, the communication subsystem 202 of the mobile telephone station apparatus 200 may be designed to operate any of a variety of voice communication networks, such as Advanced Mobile Phone Service (AMPS), Time Division Multiple Access (TDMA), CDMA, Personal Communications Service (PCS), GSM, Enhanced Data rates for GSM Evolution (EDGE), Universal Mobile Telecommunications System (UMTS), Wideband Code Division Multiple Access (W-CDMA), etc. Other types of data and voice networks, both separate and integrated, may also be utilized with the mobile telephone station apparatus 200.

When required network registration or activation procedures have been completed, the mobile telephone station apparatus 200 may send and receive communication signals over the wireless carrier network 116. Signals received from the base station radio tower 102 by the receive antenna 254 are routed to the receiver 250, which provides for signal amplification, frequency down conversion, filtering, channel selection, etc., and may also provide analog to digital conversion. Analog-to-digital conversion of the received signal allows the DSP 258 to perform more complex communication functions, such as demodulation and decoding. In a similar manner, signals to be transmitted to the base station radio tower 102 are processed (e.g., modulated and encoded) by the DSP 258 and are then provided to the transmitter 252 for digital to analog conversion, frequency up conversion, filtering, amplification and transmission to the base station radio tower 102 via the transmit antenna 256.

In addition to processing communication signals, the DSP 258 provides for control of the receiver 250 and the transmitter 252. For example, gains applied to communication signals in the receiver 250 and the transmitter 252 may be adaptively controlled through automatic gain control algorithms implemented in the DSP 258.

In a data communication mode, a received signal, such as an SMS message or web page download, is processed by the communication subsystem 202 and is input to the microprocessor 228. The received signal is then further processed by the microprocessor 228 in preparation for output to the display 226, or alternatively to some other auxiliary I/O devices 206. A device user may also compose data items, such as e-mail messages or SMS messages, using the keyboard 224 and/or some other auxiliary I/O device 206, such as a touchpad, a rocker switch, a thumb-wheel, a trackball, a touchscreen, or some other type of input device. The composed data items may then be transmitted to the base station radio tower 102 via the communication subsystem 202.

In a voice communication mode, overall operation of the device is substantially similar to the data communication mode, except that received signals may be output to the speaker 211, and signals for transmission may be generated by the microphone 212. Alternative voice or audio I/O subsystems, such as a voice message recording subsystem, may also be implemented on the mobile telephone station apparatus 200. In addition, the display 226 may also be utilized in voice communication mode, for example, to display the identity of a calling party, the duration of a voice call, or other voice call related information.

The short-range communication subsystem 204 enables communication between the mobile telephone station apparatus 200 and other proximate systems or devices, which need not necessarily be similar devices. For example, the short-range communication subsystem 204 may include an infrared device and associated circuits and components, or a Bluetooth™ communication module, to provide for communication with similarly-enabled systems and devices.

It has been known in personal audio players to offer a user a variety of acoustic EQ settings to suit the primary type of music (e.g., Rock, Hip Hop, Classical, Dance, Electronic, Jazz, Latin, Lounge, Pop, R & B) played on the player or to suit the primary listening device (e.g., small speakers) used to convert the output signal created by the player to audible sounds. However, it has heretofore been unknown to offer acoustic EQ settings to users of mobile telephony handsets.

In overview, according to an aspect of the present application, a user may adjust acoustic EQ settings used by a handset for playback of voice call downlink audio. In particular, the microprocessor 228 may be configured to provide an acoustic EQ settings user interface; the acoustic EQ settings user interface allowing a user select from among several predetermined acoustic EQ settings for processing voice call downlink audio. Once the microprocessor 228 has received, from the user, an indication of a selected acoustic EQ setting, the microprocessor 228 may process voice call downlink audio based on the selected acoustic EQ setting.

Figure 3:
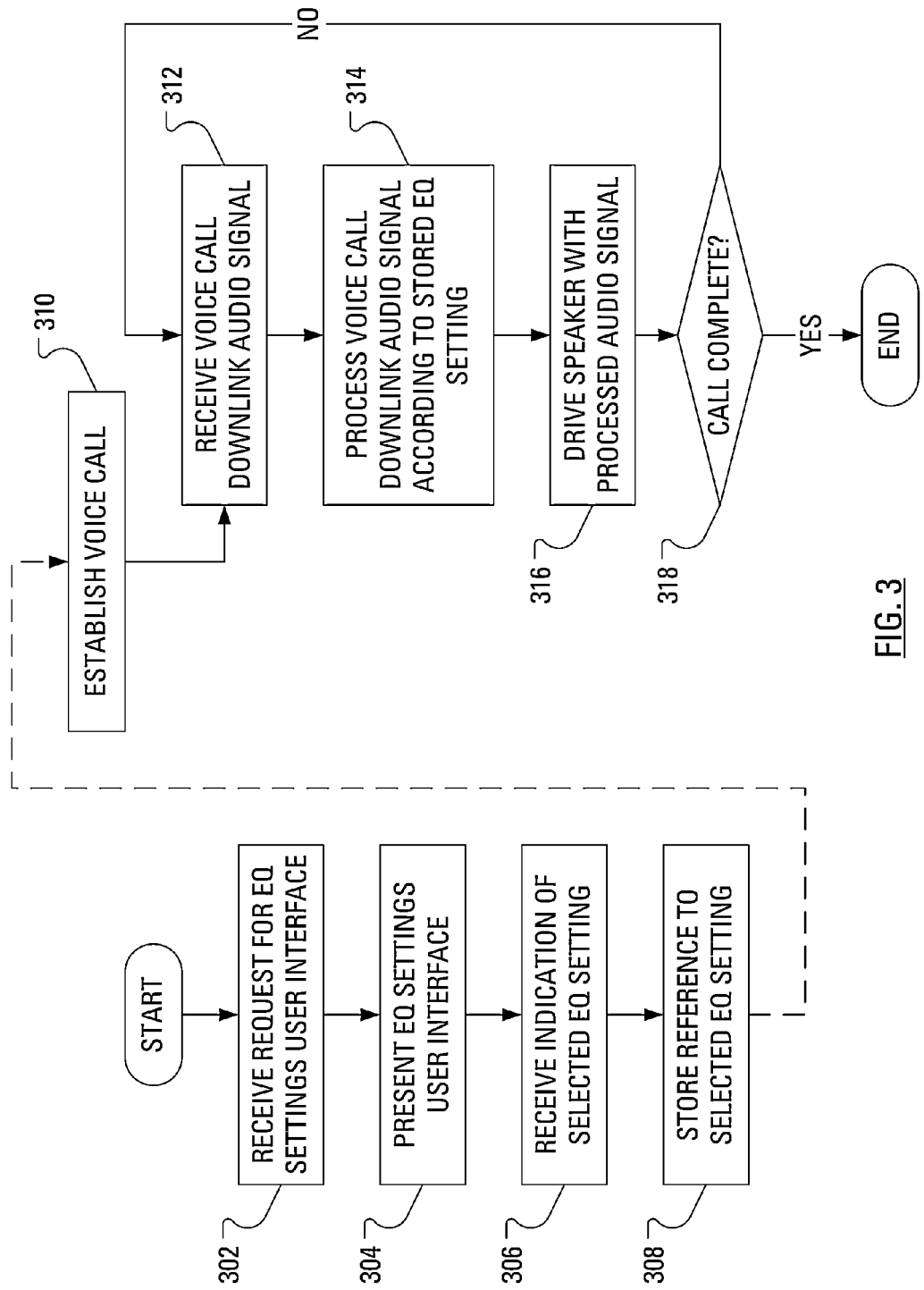
FIG. 3 illustrates steps in an example method of allowing for users to select an acoustic equalizer setting for future voice calls.

In operation, and in view of FIG. 3, initially, the microprocessor 228 receives (step 302) a request from the user, the request indicating a desire to be presented with the acoustic EQ settings user interface. In particular, the user may manipulate the keyboard 224 and/or some other auxiliary I/O device 206 to cause the microprocessor 228 to present a menu on the display 226. The user may then select a menu item in the menu, where the menu item refers to the acoustic EQ settings user interface. Responsive to receiving (step 302) such a request, the microprocessor 228 presents (step 304) the acoustic EQ settings user interface to the user, for instance, by way of the display 226. As will be discussed further hereinafter, the acoustic EQ settings user interface may include textual and/or graphical references to several predetermined acoustic EQ settings for processing voice call downlink audio. Responsive to being presented with the acoustic EQ settings user interface, the user may manipulate the keyboard 224 and/or some other auxiliary I/O device 206 to select one of the predetermined acoustic EQ settings. Subsequent to the selection, by the user, of one of the predetermined acoustic EQ settings, the microprocessor 228 receives (step 306) an indication of the selected one of the predetermined acoustic EQ settings. Upon receiving an indication of the selected acoustic EQ setting, the microprocessor 228 stores (step 308) a reference to the selected acoustic EQ setting. Once the mobile telephone station apparatus 200 has stored the selected acoustic EQ setting, the mobile telephone station apparatus 200 will employ the selected acoustic EQ setting for voice calls until another acoustic EQ setting has been selected, i.e., the selection of an acoustic EQ setting persists beyond just the next voice call.

In one aspect of the application, the microprocessor 228 arranges for a presentation, on the display 226, of an icon-based notification that indicates, on an ongoing basis, the acoustic EQ setting that has been selected. Alternatively, the notification may be text-based.

At some later time, it is anticipated that the user will employ the mobile telephone station apparatus 200 to participate in a voice call. That is, the user may use the mobile telephone station apparatus 200 to place an outgoing voice call or the user may use the mobile telephone station apparatus 200 to receive an incoming voice call. In either case, the microprocessor 228 will be involved in establishing (step 310) a voice call over a wireless telephony link. Once the voice call has been established, the mobile telephone station apparatus 200 receives (step 312) a voice call downlink audio signal over the wireless telephony link. The microprocessor 228 then processes (step 314) the voice call audio downlink signal according to the acoustic EQ setting a reference to which was stored in step 308. The processing (step 314) generates a processed audio signal. The microprocessor 228 uses the processed audio signal to drive (step 316) the speaker 211 (in one instance). In other instances, the microprocessor 228 uses the processed audio signal to drive other audio output devices among the auxiliary I/O devices 206.

The microprocessor 228 may periodically determine (step 318) whether the voice call is still ongoing. If the microprocessor 228 determines that the voice call is ongoing, the receipt (step 312), the processing (step 314) and the driving (step 316) also continues. However, if the microprocessor 228 determines that the voice call is no longer ongoing, the microprocessor 228 discontinues the receiving and the processing.

Figure 4:
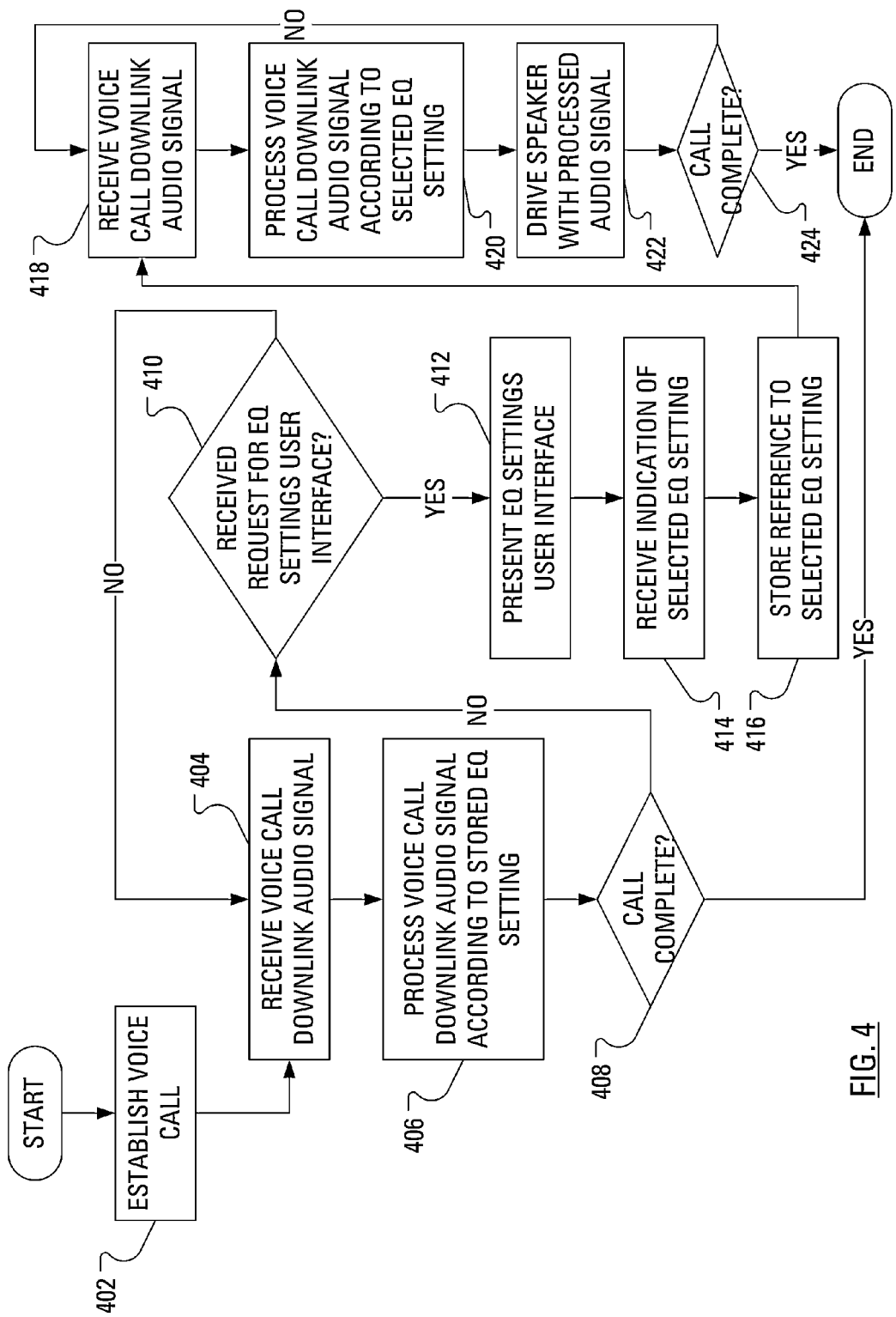
FIG. 4 illustrates steps in an example method of allowing for users to select an acoustic equalizer setting for an ongoing voice call.

While FIG. 3 illustrates example steps in a method of allowing for user-selectable acoustic EQ settings for voice calls wherein the acoustic EQ setting is established in advance of the voice call, it is also contemplated that the user may wish to adjust the acoustic EQ setting while a voice call is ongoing. Example steps in a method suitable to the latter scenario are presented in FIG. 4.

As discussed above, it is likely that the microprocessor 228 will be involved in establishing (step 402) a voice call over a wireless telephony link. Once the voice call has been established, the mobile telephone station apparatus 200 receives (step 404) a voice call downlink audio signal over the wireless telephony link. The microprocessor 228 processes (step 406) the voice call audio downlink signal according to an acoustic EQ setting a reference to has previously been stored.

The microprocessor 228 may periodically determine (step 408) whether the voice call is still ongoing. If the microprocessor 228 determines that the voice call is ongoing, the microprocessor 228 may periodically determine (step 410) whether a request for the acoustic EQ settings user interface has been received. If the microprocessor determines that such a request has not been received, the receipt (step 404) and the processing (step 406) of voice call downlink audio signals continues. However, the microprocessor 228 may determine (step 410) that a request for the acoustic EQ settings user interface has been received. Responsive to such determining, the microprocessor 228 presents (step 412) the acoustic EQ settings user interface to the user, for instance, by way of the display 226. Responsive to being presented with the acoustic EQ settings user interface, the user may manipulate the keyboard 224 and/or some other auxiliary I/O device 206 to select one of the predetermined acoustic EQ settings. Subsequent to the selection, by the user, of one of the predetermined acoustic EQ settings, the microprocessor 228 receives (step 414) an indication of the selected one of the predetermined acoustic EQ settings. Upon receiving an indication of the selected acoustic EQ setting, the microprocessor 228 stores (step 416) a reference to the selected acoustic EQ setting.

The mobile telephone station apparatus 200 continues to receive (step 418) voice call downlink audio signals. The microprocessor 228 then processes (step 420) the voice call audio downlink signals according to the acoustic EQ setting a reference to which has was stored in step 416. The processing (step 420) generates a processed audio signal. The microprocessor 228 uses the processed audio signal to drive (step 422) the speaker 211 (in one instance). In other instances, the microprocessor 228 uses the processed audio signal to drive other audio output devices among the auxiliary I/O devices 206.

The microprocessor 228 may periodically determine (step 424) whether the voice call is still ongoing. If the microprocessor 228 determines that the voice call is ongoing, the receipt (step 418), the processing (step 420) and the driving (step 422) also continues. However, if the microprocessor 228 determines that the voice call is no longer ongoing, the microprocessor 228 discontinues the receiving, the processing and the driving.

One of the predetermined acoustic EQ settings may be a "handset mode" acoustic EQ setting. The handset mode acoustic EQ setting may be particularly suited to receiving voice call downlink audio and processing the voice call downlink audio for playback to the user over the speaker 211.

Along with the handset mode acoustic EQ setting, the mobile telephone station apparatus 200 may also have a "speakerphone mode" acoustic EQ setting. The speakerphone mode acoustic EQ setting may be particularly suited to receiving voice call downlink audio and processing the voice call downlink audio for playback to the user over a speakerphone speaker among the auxiliary I/O devices 206.

In addition, the mobile telephone station apparatus 200 may have a "wired headset mode" acoustic EQ setting. The wired headset mode acoustic EQ setting may be particularly suited to receiving voice call downlink audio and processing the voice call downlink audio for playback to the user over a speaker that is part of a wired headset (not shown). A wired headset output jack may be among the auxiliary I/O devices 206.

Furthermore, the mobile telephone station apparatus 200 may have a "wireless headset mode" acoustic EQ setting. The wireless headset mode acoustic EQ setting may be particularly suited to receiving voice call downlink audio and processing the voice call downlink audio for playback to the user over a speaker that is part of a wireless headset (not shown). The wireless headset may communicate with the mobile telephone station apparatus 200 via the short-range communication subsystem 204. In particular, the wireless headset and the short-range communication subsystem 204 may make use of the known Bluetooth™ communication protocol for handling a wireless communication session.

Additionally, the predetermined acoustic EQ settings may, for example, include: an Increased Bass acoustic EQ setting, wherein lower frequency audio is amplified; an Increased Treble acoustic EQ setting, wherein higher frequency audio is amplified; and a Default or Flat acoustic EQ setting, wherein no part of the audio spectrum is amplified. Each of the acoustic EQ settings may be defined in an acoustic configuration file stored in the memory (216 or 218) of the mobile telephone station apparatus 200.

Advantageously, the user can, by using a user interface presented by the mobile telephone station apparatus 200 to select one of the predetermined acoustic EQ settings, act to match the audio response to the amount of seal that the user is able to achieve between the mobile telephone station apparatus 200 and the ear of the user for voice calls.

As will be clear to a person of ordinary skill in the art, the selection of an acoustic EQ setting may not require interaction with an acoustic EQ setting user interface specifically presented in the display 226.

Instead, particularly in those cases where there are a small number, say, three, of predetermined acoustic EQ settings, a "hot key" on the mobile telephone station apparatus 200 may allow a user to toggle, or cycle, among the predetermined acoustic EQ settings. Accordingly, a step of receiving an indication of a selected acoustic EQ setting (step 306, FIG. 3 and step 414, FIG. 4) may simply involve receiving an indication of a press event on the hot key, thereby indicating that the next acoustic EQ setting in the predetermined cycle of settings has been selected by the user.

Although the particular application is described above as relating to mobile telephony handsets, it should be clear to a person of ordinary skill in the art that the selection and use of an acoustic equalizer setting from among a plurality of predetermined acoustic equalizer settings has applicability to wired telephony as well. Additionally, it is recognized that mobile telephony can extend beyond traditional cellular telephone networks. In particular, users of portable computing devices with wireless networking capabilities, using, for example, IEEE 802.11b, 802.11a, 802.11g or 802.11n, may execute Voice-over-Internet-Protocol (VoIP) telephony applications. It should be clear that user-selectable acoustic EQ settings has applicability in wireless or wired VoIP telephony settings.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A method of allowing for user selection of acoustic equalizer settings on a handheld telephony device, wherein the handheld telephony device is operable to provide audio output via a plurality of audio output devices, including at least two of: a handset speaker, a speakerphone speaker, a wired headset and a wireless headset, said method comprising:

receiving an indication of a selection of a first acoustic equalizer setting from among a plurality of predetermined acoustic equalizer settings, wherein the plurality of predetermined acoustic equalizer settings includes:
a handset mode acoustic equalizer setting suited to audio playback over said handset speaker; and
a speakerphone mode acoustic equalizer setting suited to audio playback over said speakerphone speaker;
receiving, over a wireless telephony link, a voice call downlink audio signal;
processing said voice call downlink audio signal, based on said first acoustic equalizer setting, to generate a processed audio signal;
driving an audio output device with said processed audio signal;

receiving an indication of a selection of a second acoustic equalizer setting from among said plurality of predetermined acoustic equalizer settings;
receiving, over said wireless telephony link, a further voice call downlink audio signal;
processing said further voice call downlink audio signal, based on said second acoustic equalizer setting, to generate a further processed audio signal; and
driving said audio output device with said further processed audio signal.

2. The method of claim 1 further comprising providing a user interface, said user interface allowing a user to select an acoustic equalizer setting from among said plurality of predetermined acoustic equalizer settings.

3. The method of claim 2 wherein said providing said user interface comprises presenting a plurality of references to respective ones of said plurality of predetermined acoustic equalizer settings.

4. The method of claim 1 further comprising storing a reference to said first acoustic equalizer setting.

5. The method of claim 1 wherein said receiving said indication of said selection of said first acoustic equalizer setting comprises receiving an indication of a press event on a hot key.

6. The method of claim 5 wherein said first acoustic equalizer setting is a current acoustic equalizer setting, a cycle of said plurality of predetermined acoustic equalizer settings has been predetermined and said receiving said indication of said selection of said second acoustic equalizer setting further comprises interpreting said press event as a selection of said second acoustic equalizer setting, where said second acoustic equalizer setting follows said first acoustic equalizer setting in said cycle.

7. The method of claim 1 further comprising displaying an icon-based notification associated with said selected acoustic equalizer setting.

8. The method of claim 1 further comprising displaying a text-based notification associated with said selected acoustic equalizer setting.

9. A handheld mobile telephony apparatus operable to provide audio output via at least two of: a handset speaker, a speakerphone speaker, a wired headset and a wireless headset, said handheld mobile telephony apparatus comprising:
an audio output device;
a communication subsystem for receiving, over a wireless telephony link, a voice call downlink audio signal;
a processor adapted to:
receive an indication of a selection of a first acoustic equalizer setting from among a plurality of predetermined acoustic equalizer settings, wherein the plurality of predetermined acoustic equalizer settings includes:
a handset mode acoustic equalizer setting suited to audio playback over said handset speaker; and
a speakerphone mode acoustic equalizer setting suited to audio playback over said speakerphone speaker;
process said voice call downlink audio signal, based on said first acoustic equalizer setting, to generate a processed audio signal;
drive an audio output device with said processed audio signal;
receive an indication of a selection of a second acoustic equalizer setting from among said plurality of predetermined acoustic equalizer settings;
process said voice call downlink audio signal, based on said second acoustic equalizer setting, to generate a further processed audio signal; and
drive said audio output device with said further processed audio signal.

10. The handheld mobile telephony apparatus of claim 9, wherein said processor is further adapted to receive said indication of said selection of said second acoustic equalizer setting from among said plurality of predetermined acoustic equalizer settings whilst said further voice call downlink audio signal is being received.

11. The handheld mobile telephony apparatus of claim 9 further comprising:
a display device; and
wherein said processor is further adapted to provide a user interface on said display device, said user interface allowing a user to select an acoustic equalizer setting from among said plurality of predetermined acoustic equalizer settings.

12. The handheld mobile telephony apparatus of claim 9 wherein said providing said user interface comprises presenting a plurality of references to respective ones of said plurality of predetermined acoustic equalizer settings.

13. The handheld mobile telephony apparatus of claim 9 further comprising:
a memory; and
wherein said processor is further adapted to store, in said memory, a reference to said first acoustic equalizer setting.

14. The handheld mobile telephony apparatus of claim 9 further comprising:
a hot key; and
wherein said receiving said indication of said selection of said second acoustic equalizer setting comprises receiving an indication of a press event on said hot key.

15. The handheld mobile telephony apparatus of claim 14 wherein said first acoustic equalizer setting is a current acoustic equalizer setting, a cycle of said plurality of predetermined acoustic equalizer settings having been predetermined and said receiving said indication of said selection of said second acoustic equalizer setting further comprises said processor interpreting said press event as a selection of said second acoustic equalizer setting, where said second acoustic equalizer setting follows said first acoustic equalizer setting in said cycle.

16. A non-transitory computer readable medium containing computer-executable instructions that, when performed by a processor in a handheld mobile telephony apparatus, wherein the handheld telephony device is operable to provide audio output via a plurality of audio output devices, including at least two of: a handset speaker, a speakerphone speaker, a wired headset and a wireless headset, cause said processor to:
receive, over a wireless telephony link, voice call downlink audio signal;
receive an indication of a selection of an acoustic equalizer setting from among a plurality of predetermined acoustic equalizer settings, wherein the plurality of predetermined acoustic equalizer settings includes:
a handset mode acoustic equalizer setting suited to audio playback over said handset speaker; and
a speakerphone mode acoustic equalizer setting suited to audio playback over said speakerphone speaker;
process said voice call downlink audio signal, based on said selected acoustic equalizer setting, to generate a processed audio signal;
drive an audio output device with said processed audio signal;

receive an indication of a selection of a second acoustic equalizer setting from among said plurality of predetermined acoustic equalizer settings;

receive, over said wireless telephony link, a further voice call downlink audio signal;

process said further voice call downlink audio signal, based on said second acoustic equalizer setting, to generate a further processed audio signal; and drive said audio output device with said further processed audio signal.

17. The non-transitory computer readable medium of claim 16 wherein said instructions, when performed by said processor, cause said processor to provide a user interface on said display device, said user interface allowing a user to select an acoustic equalizer setting from among said plurality of predetermined acoustic equalizer settings.

18. The non-transitory computer readable medium of claim 17 wherein said instructions, when performed by said processor, further cause said processor to provide said user interface by presenting a plurality of references to respective ones of said plurality of predetermined acoustic equalizer settings.

19. The non-transitory computer readable medium of claim 16 wherein said instructions, when performed by said processor, further cause said processor to store, in a memory, a reference to said first acoustic equalizer setting.

20. The non-transitory computer readable medium of claim 16 wherein said instructions, when performed by said processor, further cause said processor to implement a hot key and receive an indication of a press event on said hot key.

* * * * *